Feb. 15, 1938.  L. L. SCHAUER ET AL  2,108,780
SUBMERGED MOTOR
Filed Sept. 10, 1935  5 Sheets-Sheet 3

INVENTORS
Lawrence L. Schauer
BY John H. McKewen
Albert F. Nathan
ATTORNEY

Patented Feb. 15, 1938

2,108,780

UNITED STATES PATENT OFFICE 2,108,780

SUBMERGED MOTOR

Lawrence L. Schauer, Wyoming, and John H. McKewen, Cincinnati, Ohio, assignors to The Cincinnati Bickford Tool Company, Cincinnati, Ohio, a corporation of Ohio Application September 10, 1935, Serial No. 39,884

10 Claims. (Cl. 77—32)

The present invention relates to machine tools in general, but more particularly to drilling and like machines of the hydraulically propelled type.

A primary aim of the invention is to render available a machine tool which may be set up as a permanent organization to perform a given tooling operation upon a work piece or which may be set up as a relatively temporary organization to perform an operation upon a given class of work, after which, the machine may be readily converted to one suitable for performing tooling operations on a different class of work.

The present invention achieves this object by designing and constructing the essential elements of the complete machine on the unit principle. The term "unit" as herein used is intended to mean individual machines which are fully self-contained and complete in and of themselves, one or more of which may be bolted down or otherwise secured to a support of a convenient size and configuration so as to construct composite a machine tool suitable to the particular needs of the user. Each unit, however, having its own spindle drive means, feed means, trip mechanism and control means and usually its own set of guideways, which conjointly contribute to make the assembled unit a complete machine in every way.

The use of hydraulics as the propelling or feeding medium for the head or spindle of a machine tool introduces a problem not present in mechanical machines, namely that of overcoming leakage of fluid at the various connections and between various moving parts. Ordinarily the fluid is lost to the floor of the shop and wasted and at the same time creating a hazardous slippery condition. It is a further aim of this invention to reduce the extent of such leakage by eliminating the sources from whence the out-leakage takes place. That result in the present invention is accomplished by constructing the tool head or slidable member of the machine with at least one leak-proof compartment and arranging in that compartment the entire hydraulic system including the reservoir, pump, power cylinder, valves and all the piping and connections therebetween. In consequence, any leakage of fluid about the elements of the hydraulic drive, takes place within the compartment reservoir and not to the outside of the machine. And since the whole compartment is the reservoir and practically completely filled with the oil, the leakage which does take place about the various connections is materially reduced by reason of the pressure created by the hydraulic column within the compartment. This arrangement also positively excludes air from the system and prevents the parts from running hot, as all of moving elements and parts subjected to hydraulic pressure are submerged completely in the oil and maintained thereby in a relatively cool state.

Further objects of the present invention have to do with simplification in number and design of the parts used in making up the unit organization, and to a self-contained means whereby the assembled unit may be placed and efficiently operated in any angular position without resorting to cumbersome counterweights, springs, etc. Such prior counterweighting devices are always difficult to arrange compactly. They occupy a large amount of the not-always-available space about the machine, are bulky in size, and add measurably to the gross weight of the machine and the cost of manufacture.

To obviate those difficulties, it is proposed to incorporate in the hydraulic system of the present embodiment, a pressure controlled hydraulic counterbalance valve, so designed as to seal one end of the motor against inflow or outflow of fluid when the pressure of the fluid is below a predetermined value. The valve is so arranged in the system as to be responsive to pressures from the motor side and from the pump side, in different degrees, due consideration being given in its design to the need for compensating for the normal weight of the head. With the unit arranged on an incline, the weight of the head is additive when traveling in one direction and subtractive when traveling in the other direction.

The valve, however, is of the differential type with its pressure responsive areas so proportioned that the algebraic sum of the hydraulic and mechanical forces acting thereon, normally actuate the valve to a closed position whereby flow to or from the motor is prevented and the unit thereby hydraulically locked in a position of rest. Under operating conditions the hydraulic pressure acting upon one side of the valve is increased sufficiently to unbalance the valve and move it to its open position, thereby to allow fluid to pass to the motor, or from the motor, to effect movement of the same. An undue or unforseen drop in the pressure difference across the differential valve will automatically result in the movement of the valve to a closed position, thus trapping the remaining fluid in the motor and holding the unit stationary.

A further aim of the present invention is to render available a machine tool unit capable of performing on a wide range and variety of work and obtaining in the work a high degree of accuracy in the several operations to which the unit is capable of being adapted. These ends are attained in the present construction by mounting the tool spindle and the driving and feeding means therefor in a slidable head member and mounting that member upon relatively long and widely spaced guideways. The oil compartment, above referred to, houses the entire feeding transmission, which when in operation moves the entire tool head during the idle and working strokes. As the spindle, in the present embodiment, has no axial movement relative to the head, the looseness or vibration incident to the provision of means for such movement, is eliminated, any tendency toward vibration being absorbed by the mass of the tool head proper. Accuracy and ease of movement of the head and spindle have been further promoted by arranging the head guides part-way up the sides of the head, towards the axis of the spindle, thus allowing a portion of the head to extend between and below the guiding surfaces. With such an arrangement, part of the head is above and part below the guideways, and the turning moment created by the end thrusts on the spindle is in consequence materially reduced. The present arrangement has the further advantage of allowing the power cylinder of the hydraulic feed transmission to be placed substantially in or slightly above the plane of the guide surfaces so that the pushing forces generated thereby will be transmitted to the head proper between the guideways and the spindle axis where the greatest force is required.

A further aim of this invention is to provide a simple and direct spindle and pump drive, consisting of very few gears and shafts which may be inexpensively manufactured and assembled, and to so arrange the drive that various spindle arrangements, such as single spindle or multi-spindle head attachments may be quickly applied thereto without alteration to the basic drive train.

A unit so constructed combines, in one machine, all the advantages of the single and multiple spindle machines, plus the additional advantages of being completely self-contained, powerful and leakproof and thereby capable of being placed in a variety of positions suitable to the work to be acted upon or combined with existing machines, or adapted to conveyor systems in the present day shop.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Referring to the drawings the unit consists essentially of a head member proper 10, upon which is mounted a main motor 11 that drives the spindle or spindles 12 and pump 13, through the gearing indicated generally by B and S. Power from the motor shaft 14 passes through flexible coupling 15 to shaft 16 and drives the gear 18 secured thereon. The ends of the shaft 16 are rotatively supported in antifriction bearings 17 which in turn are adequately supported by the cross bracket 10a in the head 10. The gear 18 constantly meshes with a gear 19 secured to a shaft 20 which is likewise supported at opposite sides of the gear in bearings 21 provided by the cross webbing.

At the shaft 20 the motive power divides, part going to the pump 13 through gears 22, 23 and shaft 24, and part going to the spindle 12 through the gears 25, 26, 27, 28 and shaft 29. For convenience the initial gear 22 in the pump train is made integral with the driving gear 19, and constantly meshes with the pump shaft gear 23. The spindle drive gear 25 is removably secured to the outer end of shaft 20 and is adapted to mesh with the gear 26 which is likewise removably splined to a hollow sleeve member 30. The stub sleeve 30 is journaled in antifriction bearings 31 provided by the cross webbing, and extends outwardly just short of the bottom of a diametral notch 32 formed in the outer face of the hub of the gear 26.

The hollow interior of the stub sleeve 30 is adapted to receive and support the end of a coaxial shaft 33 upon which the gear 27 is splined. The rear face of the gear 27 is provided with a diametral tongue 34 adapted to interengage the notch 32 of the gear 26 and thus when the parts are in assembled relation the one gear drives the other directly. The supporting shaft 33 is in the nature of a pilot shaft and is journaled to antifriction bearings 35 provided by the spindle head H. Thus when the spindle head H is assembled to the head 10 by means of the bolts 36, the pilot shaft 33 and sleeve 30 providing for each other relatively long bearings, the parts are maintained in true alignment. All of the gears 25, 26, 27 and 28 are splined to their respective shafts and designed and adapted to be removed and replaced by others of different sizes so that the spindle may be driven at various speeds relative to the speed of the pump and main drive motor 11.

Figures 2, 6:
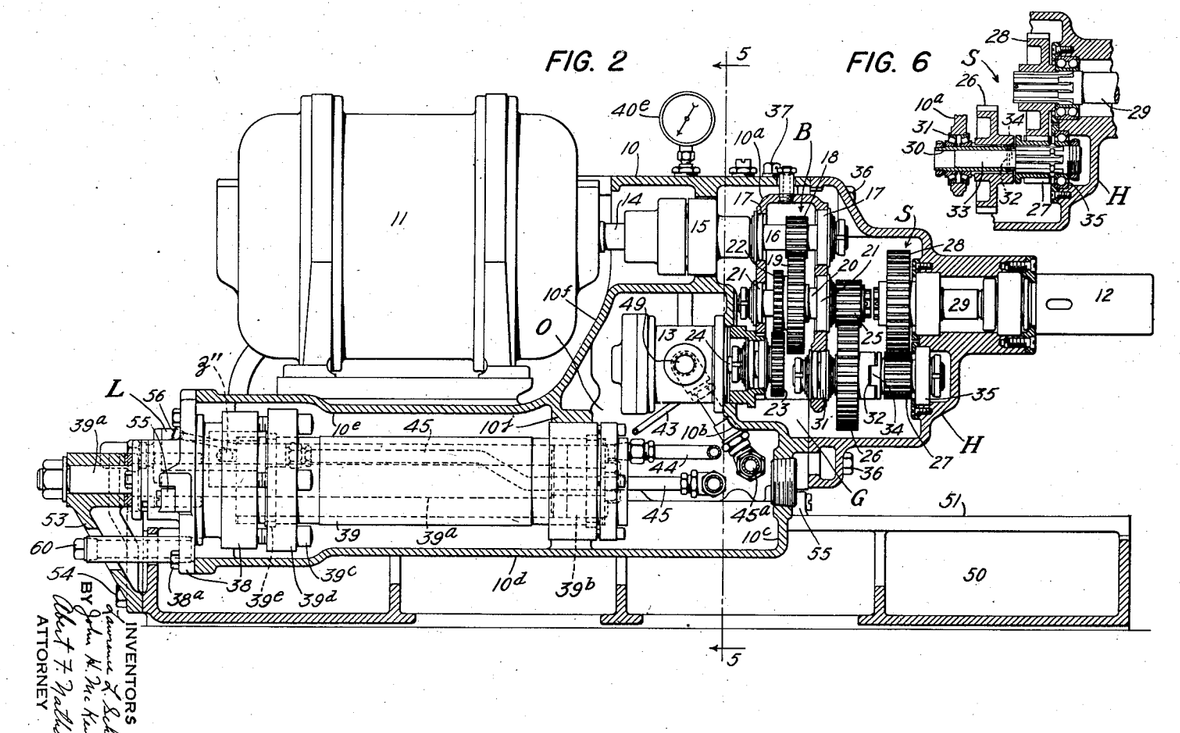
Figure 2 is a longitudinal section thereof showing the motor mounting, spindle and pump drives, and the relative positions of major elements of the hydraulic transmission contained within the oil compartment and reservoir.
Figure 6 is a detail view of the drive connection between the main and detachable heads at the point where disconnection on removing occurs.
Figures 3, 9:
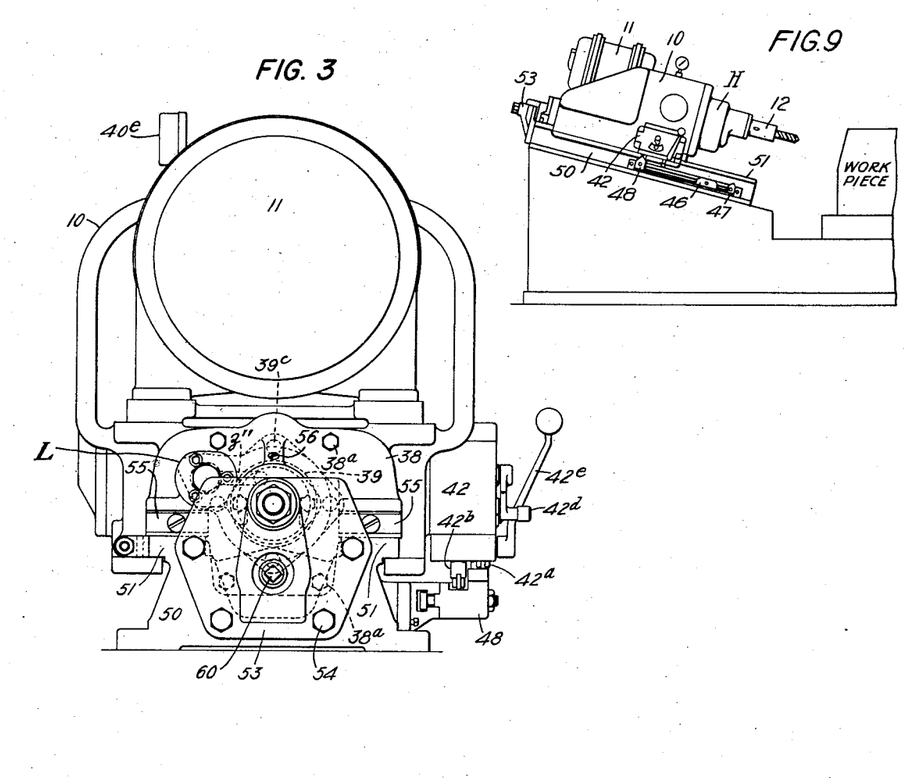
Figures 3 and 4 are left and right end views respectively of Figure 1.
Figure 9 is a view of the unit in an inclined position.

As shown more clearly in Fig. 2, a partition 10b separates the gear compartment G from the oil compartment O for the dual purpose of preventing the entrance into the oil chamber of any foreign matter that may be in the gear box G and for preventing the escape of oil from the oil compartment which might otherwise occur during the reciprocatory movement of the head or because of the angle at which the unit may be positioned when in use. The remaining walls of the oil compartment include the wall 10c, bottom wall 10d, top walls 10e and 10f, and side walls 10g and 10h. The end wall opposite wall 10c is sealed by means of a combined cylinder head and cover 38.

Figures 7, 8:
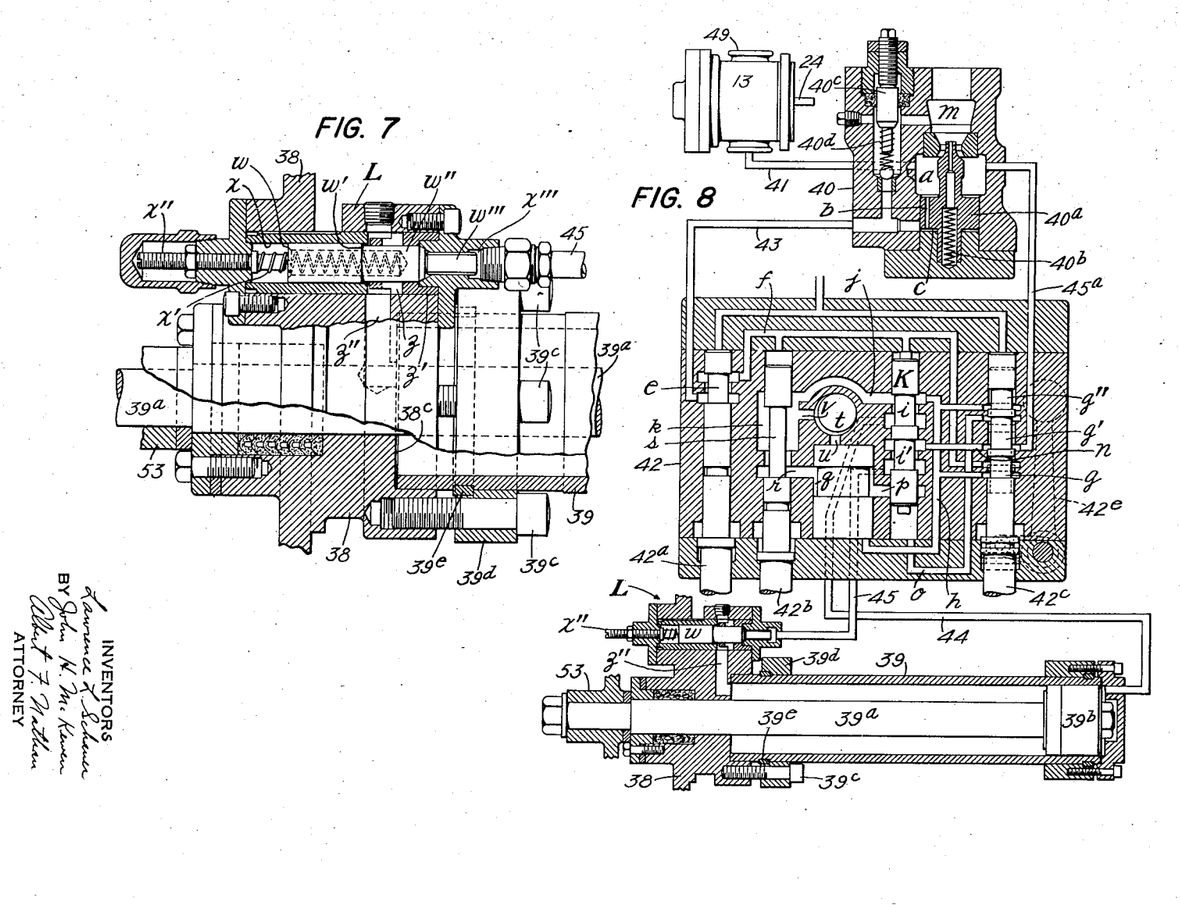
Figure 7 is a detail view of one end of the cylinder illustrating more clearly the construction of the cylinder head and the location of the hydraulic counterbalance valve means.
Figure 8 is a diagrammatic view of a typical hydraulic system, all units thereof being represented as fully submerged in the liquid and all exhaust and intake ports covered.

As above mentioned all of the hydraulic transmission elements are housed within the oil compartment and at all times submerged in the oil therein. Inasmuch as the present invention is concerned more with the relation and position than with the details of construction of the various elements per se of the hydraulic transmission, the several elements of the transmission will be described briefly. It is believed sufficient to state that the hydraulic transmission comprises a pump 13, of a well known make, a pressure control and by-pass valve 40 connected with the pump through line 41, a control device 42 which receives the fluid from the pressure valve through line 45a, and directs it under pressure selectively to opposite ends of the power cylinder 39 through the lines 44 and 45. The control device 42 includes three valve plungers 42a, 42b and 42c, an adjustable rate controlling throttle valve, the handle 42d of which is illustrated in the drawings, and a manual control handle 42e. For a normal operation of the machine the operator actuates the handle 42e and the head starts forward on its cycle, after which adjustable dogs 46, 47 and 48 successively actuate the plungers 42a, 42b and 42c and control the rate and direction of movement of the head automatically. Figure 8 illustrates in diagrammatic form the complete hydraulic system with the valve plungers 42a, b, c of the box 42 in their neutral or stop position, and all intake and exhaust ports being submerged. In this position the discharge from the pump 13 passes through line 41 to the combined pressure control and relief valve 40. Entering chamber a thereof, the fluid passes through port b in the piston head of a valve plunger 40a, to chamber c, thence through line 43, to the valve box 42. Within the valve box 42, the fluid from the line 43 passes around a reduced portion e of the plunger 42a, which in its retracted position, establishes communication with the conduit f. The flow is then directed through conduit f to and around a reduced portion g formed on the valve plunger 42c. In this neutral position of the plunger, the reduced portion g establishes communication with conduit h and the fluid passes to and around a reduced portion i on the stem of a pilot valve K to conduit j and thence to the exhaust port k. Therefore there is substantially no pressure in the chamber c of the valve 40 at this time, and the pressure acting on the piston head 40a of the valve from chamber a moves the valve, in opposition to the spring 40b, to its open position and allows fluid within chamber a to discharge through the port m to the reservoir. The amount of fluid flowing through the port m is substantially the entire discharge of the pump 13 less the relatively small amount passing to the valve box and reservoir through passages e to k as explained above.

Also communicating with the chamber a of the valve is a conduit 45a leading to the valve box 42, wherein it passes around an intermediate reduced portion g' of the valve plunger 42c to conduit n, around a second reduced portion i' on the valve plunger K, thence through line 45 to the motor cylinder where it is blocked by the position of the counterweight valve L, hereinafter more fully to be explained.

In the neutral position of the control valves the pressure fluid in line 45a is also brought into communication with conduit o which in turn communicates with the chamber formed by the lower end of the cylinder of the valve K and the fluid pressure acting therein maintains the valve K in its upward position, thereby establishing communication between the conduit 44 and the reservoir through the channels i, j and k.

Figure 1:
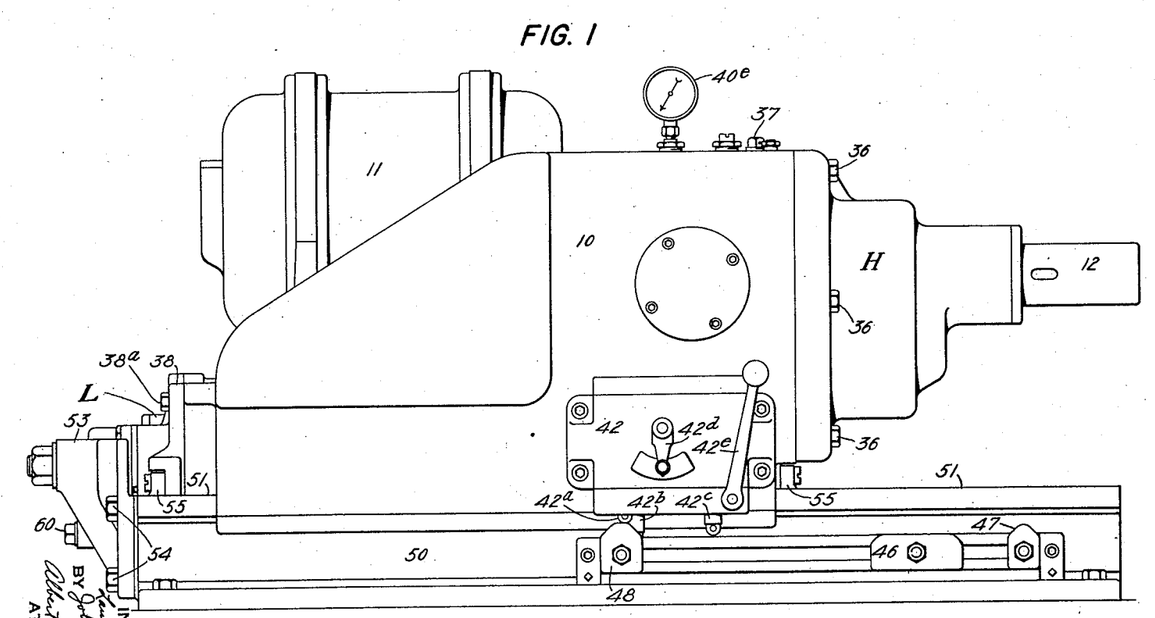
Figure 1 is a side elevation of a unit embodying the present invention.

To start the head on its forward stroke the control handle 42e is actuated to the left from the position shown in Figure 1. This movement of the handle, shifts the valve plunger 42c to its extended position (shown in dotted lines) wherein channels o and f in the valve box are closed off from channels 45a and h respectively, and line f opened to the pressure in the line 45a.

As illustrated in the drawings, line f communicates with the cylinder at the upper end of the pilot valve K and the fluid pressure acting therein moves the pilot valve plunger downwardly to its extreme position. The exhaust from the lower end of the cylinder of valve K passes through channels o, g'', and h to the reservoir. In its shifted position, pressure fluid in line 45a passes around g', through channel n around reduced portion i to the cylinder line 44.

Fluid under pressure is thereby directed to the large end of the cylinder 39, builds up a pressure in the small end of the cylinder sufficient to open the counterbalance valve L which allows liquid to discharge therethrough and the head is caused to advance at a rapid rate. Line 45, at this time is open to the reservoir through reduced portion i' of the valve K, channels p, q, r, reduced portion s of the plunger 42b to exhaust port k. As soon as the head starts to move, valve plunger 42a, rides off the stop-dog 48 and the spring within the valve moves the plunger into a position in which conduit f is closed off from the line 43.

The head moves along at the rate determined by the output of the pump until the plunger 42b engages the feed-dog 46 by which it is moved upwardly to its extreme position. In this position, the flow, theretofore passing through conduits q, r, around the portion s of the plunger and out the exhaust k, is cut off, and directed through the port u to the throttle valve t, thence through port v to the exhaust port k. The throttle valve t is adjustable from the outside of the casing by means of the hand lever 42d and may be set to impose any desired resistance on the flow thereby to produce a predetermined rate of movement of the head.

It will be apparent that the resistance imposed upon the discharge by the throttle t builds up a pressure on the forward line all the way back to the valve 40. Line 43 has been blocked, as heretofore explained, and the flow normally through the port b into chamber c of the valve is likewise blocked, except for so much thereof that escapes through an adjustable pressure relief valve 40c. The setting of this valve 40c, plus the spring 40b, determines the value to which the pressure in chamber a, and likewise the pressure in the feed side of the power cylinder, must rise before the plunger 40a will open and allow the escape of the excess fluid to the reservoir. In this way the maximum pressure available during a feed or traverse movement may be controlled. If desired, a gauge 40e may be incorporated in the system to indicate the pressure existing.

At the end of the feed movement the plunger 42c engages the dog 47 and is shifted to the position shown in the drawings and reestablishes communication between the conduit 45a and the conduit o which leads to the lower end of the cylinder of the pilot valve K. The other end of the cylinder of valve K is at this time open to the exhaust as previously explained. The pressure fluid acting in the lower end of the cylinder of the valve K moves the plunger to its extreme upward position thereby to establish communication between the pressure conduit 45a, g', n, i' and conduit 45 leading to the counterbalance valve L and the small end of the motor 39. Pressure in line 45 consequently opens the counterbalance valve L and propels the motor at a rapid rate in the reverse direction. The fluid discharged from the opposite end of the motor passes back through conduit 44 around a reduced portion i of the valve plunger K, through conduit j to the exhaust port k. As the head arrives at its retracted or starting position, plunger 42a engages the stop-dog 48 by which it is shifted to its upward position shown in the diagrammatic drawings. When that occurs communication is established between line 43 and conduits f, h, j, etc., to the reservoir which relieves the pressure in the chamber c of the by-pass valve 40. The plunger 40a thereof immediately moves to its open position allowing the pump 13 to discharge substantially pressure free to the reservoir. The counterbalance valve closes and locks the tool head in its retracted position with the parts ready for the initiation of a repeat cycle. The foregoing system being of a standard and well known commercial system it is believed unnecessary for those skilled in this art to go into further detail.

Referring more particularly to Figures 2 and 7, the counterbalance valve L comprising a differential plunger element w movable within a bore x provided in the cylinder head 38. The differential plunger w is formed with a piston portion w', a valve portion w'', and a pilot portion w'''. The intervening steps between said portions providing annular areas against which the fluid pressure reacts. The larger end of the valve plunger engages a spring x', the tension of which may be conveniently adjusted from the outside of the unit by the screw x'' to compensate for heavy tools or to adapt the unit to a particular grade or incline. The pilot portion w''' of the valve plunger is provided with flattened sides to provide passage-ways for the fluid between the area w'' at the end of the valve portion and the chamber x''' that communicates with the conduit 45. Pressure in the conduit 45 acting upon the end of the valve plunger and also on the annular area of the portion w'' tends to shift the valve axially, in opposition to the spring x', to a position in which the end of the valve portion uncovers a port z in a sleeve member z'. When that occurs the fluid from conduit 45 passes to conduit z'' and the small end of the motor cylinder.

The cylinder conduit z'' also communicates with the annular area of the piston portion w' and the pressure therein also tends to open the valve or to maintain the valve open after it has once been opened by the pressure in line 45. The area w' is so portioned, however, with respect to the strength of the spring x' that the static pressure of the liquid in conduit z'', created by the weight or inertia of the head, is insufficient to move the valve to its open positon and allow the liquid to exhaust from the conduit z''. Under operating conditions, the pressure fluid directed to the large end of the motor on a traverse or feed stroke raises the pressure in the discharging side of the motor to a value sufficient to overcome the force of the spring x' and the valve opens permitting the liquid to discharge to the conduit 45. Similarly, on the return stroke, the pressure of the liquid in conduit 45 acts upon the end of the valve plunger w and on the area w'' of the valve portion, in opposition to the spring x', and moves the valve to its open position thus allowing the pressure liquid to pass into the small end of the power cylinder and propel the unit in the reverse direction. Thus, in either direction of movement of the unit the pressure in the line 45 or in the conduit z'' must be of a predetermined value before the counterbalance valve will open to permit any flow to or from the motor. Should the pressure at either side of the valve drop below the predetermined value, as for example such as would be caused by a bursting pipe, the valve automatically moves to its closed position and seals the motor against any exhaust and prevents the head from falling. When the unit is disposed in either an angular or a horizontal position, the counterbalance valve performs the further function of automatically preventing overrun of the unit at each end of its stroke when the propelling pressure is cut off.

The counterbalance valve is built into the cylinder head not only to facilitate the manufacturing and assembling of the parts required but for the further reason of reducing the distance between the valve and power cylinder to insure continuous and reliable operation of the safety means.

Figure 7 also illustrates an improved method of securing the cylinder 39 to the cylinder head 38. In the conventional flange-and-cap-screw arrangements heretofore used, the force exerted by each of the several screws necessarily fell a considerable distance outside of the walls of the cylinder, and was entirely local in its effect. As a result, the cylinder head tended to spring when under pressure and open at the joint.

In the present construction leakage at the juncture of the cylinder and cylinder head is eliminated by setting the end of the cylinder in an annular recess 38c formed in the cylinder head. Suitable packing material is previously inserted between the end of the cylinder and the bottom of the recess. In order to urge the parts tightly together clamp screws 39c are provided which pass through a clamp ring 39d, which in turn is locked to the cylinder by an annular key 39e. The screws have a threaded connection with the cylinder head 38 and as they are successively tightened, urge the parts together. Although the screws in the present construction are located in a circle outside of the cylinder, the force thereof is distributed circumferentially about the clamp ring 39d, which in turn transmits the clamping force to the cylinder in a line coincident with the line of the cylinder wall. The opposite end of the motor may be sealed in the same manner, if desired.

As herein explained the cylinder head and cover 38 not only closes the end of the power cylinder 39, and the end of the oil chamber O, but it also houses the counterbalance valve L and oil packing for the piston rod 39a. In view of its mass it has little or no tendency to distort or spring under high pressure. The only possible source of leakage from a unit constructed in this manner is about the piston rod 39a. The leakage at that point, however, is effectively minimized by having the piston rod closely fit the opening in the cover plate ahead of the packing, and by making that section of the bearing relatively long. The leakage crevice therethrough will offer so great a resistance to the flow that the pressure will be reduced substantially to zero before the flow reaches the stuffing box. Any liquid that does reach the stuffing box will, in consequence, be hardly more than enough to lubricate the parts.

In this construction the valve box 42 is set into and forms in effect a part of the wall 10g of the oil compartment, and all of the pipe connections to and from the valve box enter the box at the rear thereof and are maintained well covered with oil at all times. This submerged condition also applies to the power cylinder 39, pressure valve 40, pump 13 and pump inlet 49, and the piping 41, 43, 44 and 45 and return lines to the reservoir O. In this manner air is positively excluded from the system and the temperature of the various elements and particularly the power cylinder pump and pressure lines are maintained at a low, substantially constant value whereby the system is kept free from any pronounced variations due to viscosity changes. Any leakage which may occur from the various elements or at the various submerged connections is thereby materially lessened, and entirely eliminated insofar as leakage to the floor is concerned.

Figure 4:
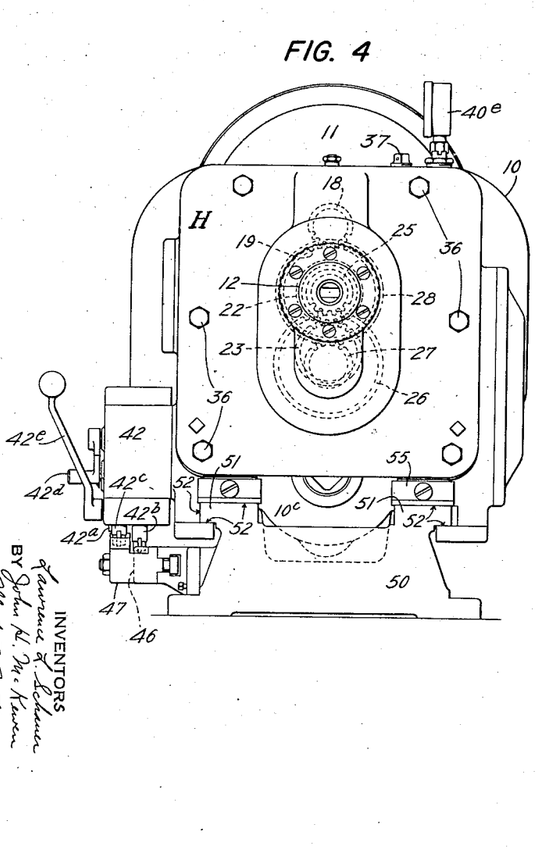
Figure 5:
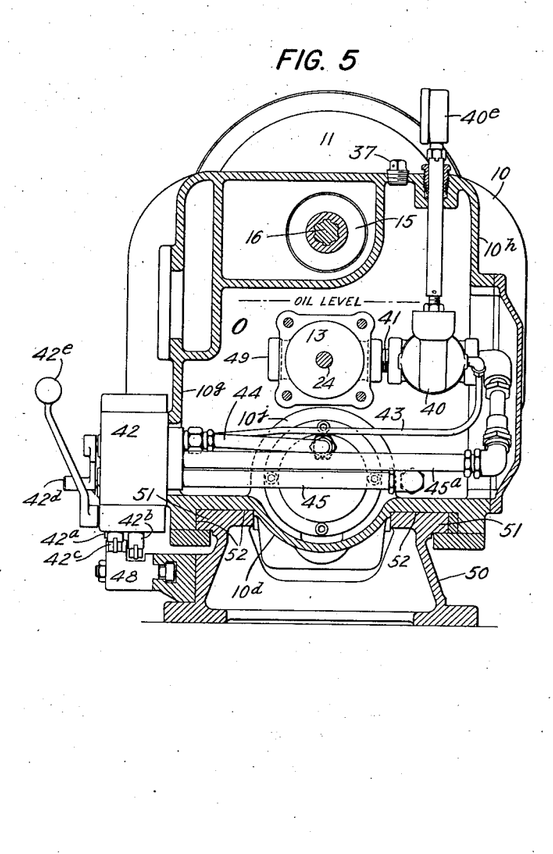
Figure 5 is a sectional view taken along line 5—5 of Figure 2.

In order that two or more of these units may be positioned side by side in a restricted area the axis of the power cylinder and several shafts, heretofore mentioned, are placed preferably in a single vertical plane, as shown more clearly in Figures 4 and 5. To bring the axis of the spindle 12 as close as practicable to the guides for the purpose of obtaining greater rigidity without sacrificing ease of movement, the guiding frame 50 is constructed U-shaped in cross-section. The upstanding sides of the frame 50 are spaced apart sufficiently to allow a substantial portion of the head proper to depend therebetween. The top portions of the frame 50 are provided with relatively wide guideways 51, each of which have finished bearing surfaces for guiding and supporting the tool head against vertical and lateral thrusts. The tool head proper is likewise provided with complemental bearing surfaces 52 which coact with the guides on the frame in maintaining the head and spindle carried thereby in true alignment.

The hydraulic transmission, above referred to, provides the means for traversing the head along the frame, and is conveniently accomplished in the present construction, by securing the outer end of piston rod 39a of the power cylinder 39 to a fixed bracket member 53. The bracket member 53 is, in effect, an integral part of the frame 50, but to simplify manufacture and assembling, it is made separately and secured in place by bolts 54.

The power cylinder 39 translates with the head 10 and is secured to the head at one end by means of the cylinder head and cover bracket 38 and bolts 38a, and at its other end by means of a webbing bracket 10j. Thus the oil under pressure delivered by the pump 13, which, through and under the control of the control valve device 42, enters the conduit 44, reacts against the larger face of the piston 39b and propels the head toward the right in Figure 2. Oil discharged from the rear side of the piston 39b passes back through the line 45, valve box 42, etc., and to the reservoir. The converse occurs when the head is propelled in the reverse direction.

The lowering of the tool head into the frame of the machine, and the location of the power cylinder in the lowered portion thereof in the manner disclosed, results in obtaining the effective pushing force of the power cylinder substantially in the horizontal plane of the guideways of the part moved thereon. In consequence, there is no additive force from that source tending to cant the tool head on the guides. And by placing the axis of the power cylinder between the horizontal plane of the guideways and the axis of the spindle, the pushing force of the cylinder counteracts the thrusts on the spindle. Thus the tendency of the tooling thrusts to cant the head is, in this construction, counteracted by the pushing force of the power cylinder, the net result being accurate alignment of the spindle as well as ease and freedom in the movement of the entire head. To prevent chips of metal, dirt, grit, etc. from getting under the head guides, each end of the head guides is provided with a wiper 55 which cleans the ways in advance of the tool head in each direction of movement.

The operation of the unit is as follows: the oil compartment is filled with oil or other hydraulic medium having the desirable properties, and the plug 37 secured in place, (air entrapped within the power cylinder is removed by opening the vent 56). The operator attaches the proper speed gears and places in position the proper spindle head H (only one of which is illustrated), sets the feed, reverse and stop dogs 46, 47 and 48 respectively, in the desired positions, adjusts the feed rate throttle lever 42d to the feed rate desired and the machine is ready for operation upon the closing of the switch of the electric drive motor. Such a unit, it will be seen, is completely self-contained, it may be positioned wherever desired and operated at various angles and directions. There are no gearing or shafting problems, to be considered in the positioning of the unit, all of those elements being compactly arranged within the tool head itself. The working parts are thereby maintained fully lubricated, guarded and protected from accidental injury during normal operation. The power cylinder translates with the other elements of the hydraulic transmission, and has the fluid pressure conduits connected rigidly with its opposite ends. The assembled unit is, accordingly, devoid of flexible or extensible conduit connections and their attendant disadvantages such as "water hammer" and leakage.

It will be observed also that the pump and pump intake, the power cylinder and its rigid fluid connections, as well as the valves and their rigid connections are at all times submerged in a bath of oil which precludes the entrance of any air into the system. Any undue rise in the temperature in any portion of the system is immediately dissipated in the large volume of oil surrounding the parts and any leakage occurring about the various joint connections occurs inside of the oil compartment. A drain plug 60, conveniently located at the lower part of the oil compartment provides a ready means for draining the system.

Without further analysis the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, we claim as new and desire to secure the following combinations and elements, or equivalents thereof, by Letters Patent of the United States:

1. A unitary machine tool assembly combining a frame member having opposed upstanding sidewalls; guideways formed along the upper edges of said walls; a tool head slidably mounted on said guideways and having a longitudinally arranged fully closed oil compartment for propelling liquid extending a substantial distance inwardy between the said side walls of said frame member; a tool spindle journaled in said head; an hydraulic power transmission for propelling said head along said guideways and for rotating said spindle including a prime mover carried bodily by said head, a pump located in said oil compartment, driving connections between said pump and prime mover and between said spindle and said prime mover, a power cylinder located in the lower portion of said oil compartment and secured to and translatable with said head, a non-translatable piston and piston rod in said cylinder, the axis of said cylinder, piston and piston rod being longitudinally disposed within said oil compartment; and means mounting said cylinder in said head and said piston and piston rod to said frame in a position such that the axis of said members lies substantially in the plane of the said opposed guideways, said last named means including a combined cylinder head and supporting bracket member for closing the rod end of said cylinder and the ajacent end of said oil compartment and for mounting said cylinder in fixed relation to said slidable head member within the lower portion of said oil compartment.

2. A machine tool combining a substantially U-shaped frame member, guideways formed along the upper longitudinal edges of said frame; a tool head slidably mounted on said guideways and having a portion thereof depending between the longitudinal edges of said frame and to a point substantially below the horizontal plane of said guideways; an hydraulic system for translating said head along said guideways including a pump and an hydraulic motor of the piston and cylinder type longitudinally arranged within the said depending portion of said head means connecting one of the said elements of said motor to said frame and the other element of said motor to said tool head thereby to effect movement of said head along said ways when the said motor is actuated, one of said connecting means being constructed to afford a combined cylinder head for the rod end of said cylinder and a closure for the adjacent end of said oil compartment so constructed that the horizontal axis of said motor lies substantially in the horizontal plane of said guideways; and an hydraulic medium in said depending portion of said head being adapted to contain propelling oil for the said system to a depth sufficient to maintain the cylinder of said motor and the said pump submerged in a bath of liquid, the static pressure and volume of the oil in said portion serving to counteract natural leakages of oil out of said system and to maintain a uniform condition of temperature of the oil therein.

3. In a machine tool having a frame, a head member movable upon said frame, a tool spindle journaled in said head, and power means for rotating said spindle combining, hydraulic means for moving said head and spindle along said frame, comprising a walled liquid compartment isolated from said spindle rotating means provided by said tool head and normally filled with liquid and sealed against the leakage of liquid therefrom, an hydraulic motor cylinder mounted in said compartment, driving connections between said motor and said frame and said head member whereby said head and spindle may be moved relative to said frame when the motor is actuated; a constant delivery pump mechanism mounted in said compartment for supplying liquid from said compartment under pressure to said motor; a control valve mounted upon said head member adapted to control the rate and direction of flow of liquid between said pump and motor; rigid liquid conduit connections between said motor, pump, and control valve, said pump, motor cylinder and said connections being mounted inside of said compartment and submerged in the liquid normally contained therein; and means extending through one wall of said compartment and operatively connected with said spindle rotating means for driving said pump.

4. A machine tool unit combining a support having upstanding sidewalls; guideways formed along the upper edges of said walls; a tool head slidably mounted on said guideways and having an oil compartment therein, a portion of said compartment depending a substantial distance inwardly between the walls of said support; a tool spindle journaled in said head; power means isolated from said oil compartment for driving said spindle; an hydraulic transmission located in said oil compartment for propelling said head along said guideways including a power cylinder located in the said depending portion of said tool head and secured to and translatable with said head, a nontranslatable piston and piston rod coacting with said cylinder, said rod having a rigid connection with said support; and means for supplying liquid derived from said oil compartment under pressure to said cylinder thereby to effect movement of said head along said support; said oil compartment being normally maintained filled with oil to a depth sufficient to submerge said motor cylinder and said liquid supplying means completely thereby to exclude air therefrom and to act as a heat dissipating medium for said motor.

5. A machine tool combining a substantially U-shaped frame member, guideways formed along the upper longitudinal edges of said frame; a tool head slidably mounted on said guideways and having a portion thereof depending between the longitudinal edges of said frame to a point substantially below the horizontal plane of said guideways; tool operating means carried by said head; an hydraulic system for translating said head along said guideways including a pump, a hydraulic motor of the piston and cylinder type and a system of fluid conduits, said motor being longitudinally arranged within the said depending portion of said head; means connecting one of the said elements of said motor to said frame and the other element of said motor to said tool head thereby to effect movement of said head along said ways when the said motor is actuated, and means tending to counteract the leakage of liquid out of said hydraulic system and positively to exclude air from said hydraulic system comprising an hydraulic medium in said depending portion of said head of a depth sufficient to maintain said pump, motor cylinder and system of fluid conduits completely submerged in a bath of fluid and a partition wall isolating said tool operating means from the body of hydraulic medium in said depending portion.

6. The combination in a self-contained machine tool unit having a translatable head member and a spindle journaled therein; of an oil compartment and a drive gearing compartment in said head, said oil compartment being sealed against external leakage and normally substantially filled with oil, a partition wall extending between said compartments, an hydraulic propulsion system including a constant displacement pump and a motor for propelling said translatable head, said motor being mounted in said oil compartment and submerged in the oil therein and said pump being mounted upon said partition wall and likewise submerged in oil in the said oil compartment; a pump shaft extending from said pump through said partition wall and into said drive gearing compartment; a main driving motor; a shaft therefrom leading into said drive gearing compartment, and reduction gearing between said pump shaft and said motor shaft and between said spindle and said motor shaft arranged within said drive gear compartment for effecting a drive to said spindle and to said pump at predetermined rates.

7. In a machine tool unit having a frame member, a tool head member movable thereon, and a detachable spindle head mounted on said tool head, the combination of hydraulic means for propelling said tool head on said frame including a constant displacement hydraulic pump mechanism; means for driving said pump to effect movement of said tool head and for rotating the spindle of said spindle head, comprising a main drive shaft, a stub shaft arranged in parallelism therewith and having a geared connection therebetween; a pump shaft, and a geared connection between said pump shaft and said stub shaft, said main shaft, stub shaft and pump shaft each having journal bearings in said tool head, and means for driving the spindle of said detachable head from said stub shaft comprising a first pick-off change gear unit mounted on said stub shaft, a sleeve shaft journaled in said tool head, a cooperating second pick-off gear unit mounted upon said sleeve shaft, a pilot shaft journaled in said detachable spindle head and adapted to telescope with the said sleeve shaft when said detachable head is in an attached position, a third pick-off gear mounted upon said pilot shaft, and a cooperating fourth pick-off gear mounted upon the said spindle, and clutch means between the adjacent faces of said second and third pick-off gears adapted to establish a driving connection to said spindle at a rate determined by the ratios of said pick-off gears when said spindle head is attached to the tool head.

8. A self-contained drill unit having a translatable main head member, a detachable spindle head member, a drill spindle journaled therein, and power means for translating said main head member and parts carried thereby, combining a main power shaft and changeable speed gearing between said power shaft and the spindle of said detachable head comprising a second shaft journaled in the main head parallel to said power shaft, intermeshing driving and driven gear elements on said shafts; a third shaft journaled in said main head in the same plane as and parallel to said first and second mentioned shafts; intermeshing speed change pick-off gears mounted upon said second and third shafts, a fourth shaft journaled in said detachable spindle head and having a geared connection with said spindle, said fourth shaft being arranged in coaxial alignment with said third shaft, and interengaging means between the gears of said third and fourth shafts effective only when said detachable head is secured in position to said main head, for establishing and maintaining the drive between said main power shaft and said spindle.

9. In a machine tool having a frame, a head member movable thereon and a tool spindle journaled in said head, the combination of hydraulic power means for translating said head, including a liquid compartment provided by said tool head and normally filled with the propelling liquid and sealed against the leakage of liquid therefrom; an hydraulic motor of the reciprocating cylinder type mounted in said compartment below the level of the liquid therein, driving connections between said motor and said frame and head member whereby said head and spindle may be moved relative to said frame when the motor is actuated; said cylinder having a piston rod extending therefrom and out of said compartment; means carried by said head for supplying liquid under pressure to said motor; a single means for sealing the end of said cylinder and the opening in said compartment through which said rod extends against leakage of liquid comprising an element provided with a recess therein adapted to receive the end of said cylinder and a laterally extending flange portion adapted to extend across the end of the compartment for sealing same; and means for attaching said cylinder to said element in liquid tight relation.

10. An hydraulic system for propelling an element of a machine tool selectively in reverse directions and in which the force of gravity is additive in one direction of movement and subtractive in the other direction of movement combining, a closed liquid reservoir; an hydraulic motor of the piston and cylinder type within said reservoir and normally fully submerged in the liquid therein; a cylinder head member for said motor provided with an aperture through which the piston rod of the motor projects, said cylinder head being also provided with means for sealing the end of the reservoir against leakage; liquid pressure supply conduits for conveying supply liquid selectively to opposite ends of said motor; counterbalance means for said machine element comprising a differential piston valve element movable in an aperture also provided in said cylinder head, said valve element having pressure responsive areas of different sizes in liquid communication with the interior of the motor and with one of said supply conduits, whereby the valve element is more sensitive to movement by the pressure acting upon one of said areas than upon the other; resilient means acting on said valve element in opposition to the hydraulic forces exerted upon said areas normally tending to move said valve element to its valve closed position thereby to prevent inflow or outflow of fluid from said motor; and manually operable means operable from the outer side of said cylinder head for adjusting the value of said resilient means and thereby the hydraulic forces required to move said valve to its opened position.

LAWRENCE L. SCHAUER.
JOHN H. McKEWEN.

CERTIFICATE OF CORRECTION.

Patent No. 2,108,780.　　　　　　　　　　　　　　February 15, 1938.

LAWRENCE L. SCHAUER, ET AL.

It is hereby certified that error appears in the printed specification of the above numbered patent requiring correction as follows: Page 3, first column, line 66, for "cyinder" read cylinder; page 6, first column, line 31, claim 1, for "ajacent" read adjacent; page 7, first column, line 41, claim 7, after "change" insert the word speed; and that the said Letters Patent should be read with these corrections therein that the same may conform to the record of the case in the Patent Office.

Signed and sealed this 29th day of March, A. D. 1938.

(Seal)　　　　　　　　　　　　　　　　　　　　Henry Van Arsdale,
　　　　　　　　　　　　　　　　　　　　Acting Commissioner of Patents.